United States Patent [19]
Chagawa

[11] 3,958,837
[45] May 25, 1976

[54] IDLER

[75] Inventor: Chikashi Chagawa, Hirakata, Japan

[73] Assignee: Kabushiki Kaisha Komatsu Seisakusho, Tokyo, Japan

[22] Filed: July 2, 1974

[21] Appl. No.: 485,230

[30] Foreign Application Priority Data
Feb. 25, 1974 Japan............................ 49-21708

[52] U.S. Cl................................... 305/21; 74/443
[51] Int. Cl.$^2$........................................ B62D 55/14
[58] Field of Search ................. 305/11, 12, 13, 21, 305/24, 25, 27; 74/243 R, 443

[56] References Cited
UNITED STATES PATENTS

| | | | |
|---|---|---|---|
| 2,970,867 | 2/1961 | Ruf....................................... | 305/24 |
| 3,263,315 | 8/1966 | O'Brien................................. | 305/24 |
| 3,304,795 | 2/1967 | Rouverol .............................. | 74/443 |
| 3,483,766 | 12/1969 | Erickson ............................... | 74/443 |
| 3,578,822 | 5/1971 | Slemmons............................. | 305/24 |
| 3,580,093 | 5/1971 | Tomizawa.............................. | 305/27 |
| 3,605,513 | 9/1971 | Sugimoto .............................. | 74/443 |
| 3,787,099 | 1/1974 | Tucker et al. ........................ | 305/25 |
| 3,797,895 | 3/1974 | Tomizawa.............................. | 305/27 |

*Primary Examiner*—Philip Goodman
*Assistant Examiner*—John A. Carroll
*Attorney, Agent, or Firm*—Armstrong, Nikaido & Wegner

[57] ABSTRACT

An idler for use in a bulldozer, etc., comprising an idler proper having an annular groove on its peripheral surface and a shock-absorbing member fitted in said annular groove. Thus the shock-absorbing member can be made sufficiently thick to minimize impulsive noises during operation.

4 Claims, 8 Drawing Figures

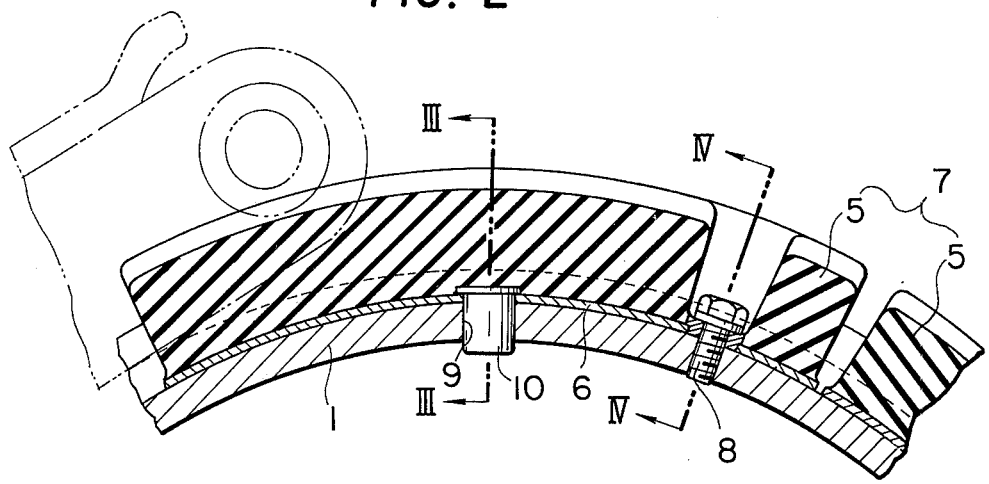
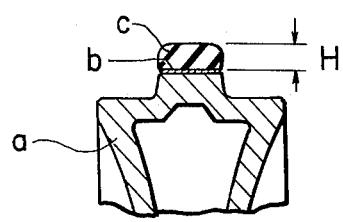
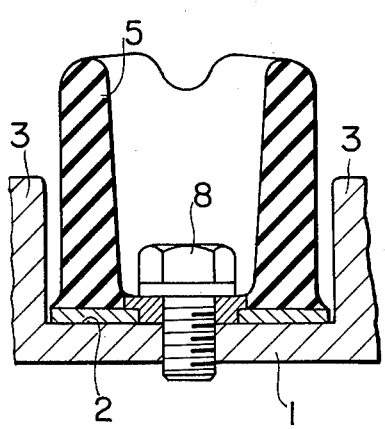
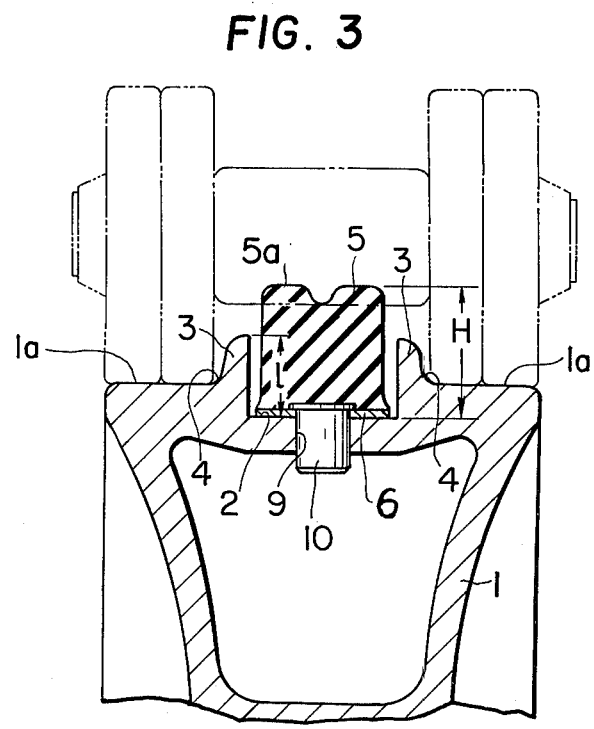
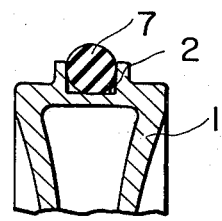

IDLER

This invention relates to an idler for use in adjusting the tension of the track of a crawler vehicle such as a bulldozer.

A conventional idler which is usually provided at its peripheral surface with a rubber shock-absorbing member, has disadvantages such that it cannot sufficiently reduce the spontaneous noises generated by the impulsive contact between the track of a crawler and the idler, as will be described later in detail with reference to the drawings.

This invention generally contemplates elimination of the aforementioned disadvantages of a conventional idler and the provision of a novel and improved idler.

It is, therefore, an object of the present invention to provide an idler which can reduce spontaneous noises during operation.

It is another object of the present invention to provide an idler the endurance of which is remarkably long.

Briefly, according to the present invention, there is provided an idler comprising an idler proper having an annular groove on its peripheral surface, and a shock-absorbing member fitted in said annular groove.

A more complete appreciation of the present invention will be readily apparent the same becomes clearer by reference to the following detailed description when taken in conjunction with the accompanying drawings, wherein:

FIG. 1 is a fragmentary sectional view of a conventional idler;

FIG. 2 is a longitudinal sectional view of an idler according to the present invention;

FIG. 3 is a cross sectional view taken along a line III—III of FIG. 2;

FIG. 4 is a cross sectional view taken along a line IV—IV of FIG. 2;

FIG. 5 is a cross sectional view of a second embodiment of an idler according to the present invention;

Reference is now made to the drawings, wherein like reference numerals and characters designate identical, or corresponding parts throughout the views.

Figure 6A:
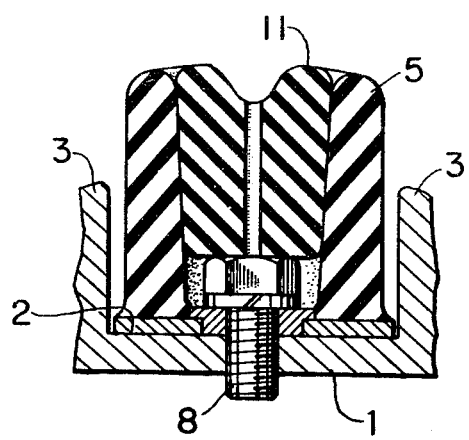
FIG. 6A is a cross sectional view of a third embodiment of an idler according to the present invention.

Before describing the details of the present invention, it will be helpful to describe the disadvantages of a conventional idler for use in adjusting the tension of the track of a track type vehicle with reference to FIG. 1.

As shown in FIG. 1, a conventional idler $a$ is provided on its outermost peripheral surface $b$ with a rubber member $c$. With the above-mentioned construction, the links of a track type vehicle track do not come into contact directly with the idler, but with the rubber member thereon. Thus the noise which would be otherwise created by the spontaneous contact occurring between the track and the idler during operation is reduced. However, with this construction, the idler has disadvantages such that it cannot sufficiently reduce the spontaneous noises occurring between it and the track since the rubber member $c$ is provided on the outermost surface $b$ and therefore the height H thereof cannot be made sufficiently great thereby reducing the shock-absorbing effect thereof.

Referring now to FIGS. 2 to 7, the present invention will be hereinafter described in detail.

As shown, an idler proper 1 is provided along the middle of its peripheral surface with an annular groove 2. Both side walls 3 of the annular groove 2 are projected externally from the peripheral surfaces 1a of the idler proper 1 to form stepped portions 4.

A plurality of arc-shaped unit shock-absorbing members 5 are fixed to mount-plates 6, respectively, by suitable means, such as sintering, and are provided in the annular recess 2 to form an annular shock-absorbing member 7. Each of these unit shock-absorbing members 5 is interchangeably fixed in the annular groove 2 and is also provided with a positioning pin 10 to be fitted into a positioning hole of the annular recess.

With this construction, the height H of the shock-absorbing member 5 can be increased by the depth l of the annular groove 2 and, therefore, the spontaneous noises generated by the contact between the track and the idler can be sufficiently reduced. In addition, the endurance of the shock-absorbing member 5 can be increased since the side walls 3 prevent the shock-absorbing member 5 from tumbling.

The shock-absorbing member 7 may be divided into a plurality of unit members 5 as memtioned above. However, it may be of a one-piece structure fitted and fixed in the annular groove 2. In this case, the shock-absorbing member 7 may be circular in cross section. If circular in cross section, its endurance is most excellent.

Figure 6B:
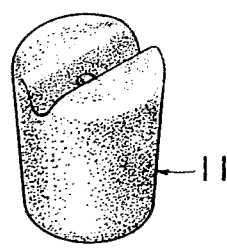
FIG. 6B is a partial perspective view of the idler as shown in FIG. 6A.

In the foregoing embodiment shown in FIG. 4, there is a possibility that soil or sand, etc., may enter from the upper side of a bolt 8. In order to protect this, another shock-absorbing member 11 as shown in FIG. 6B is inserted thereinto as shown in FIG. 6A. The shock-absorbing member 11 is interchangeably secured to the shock-absorbing member 5 with an adhesive agent. According to this embodiment thus constructed, the durability of the shock-absorbing member 7 is further increased.

Figure 7:
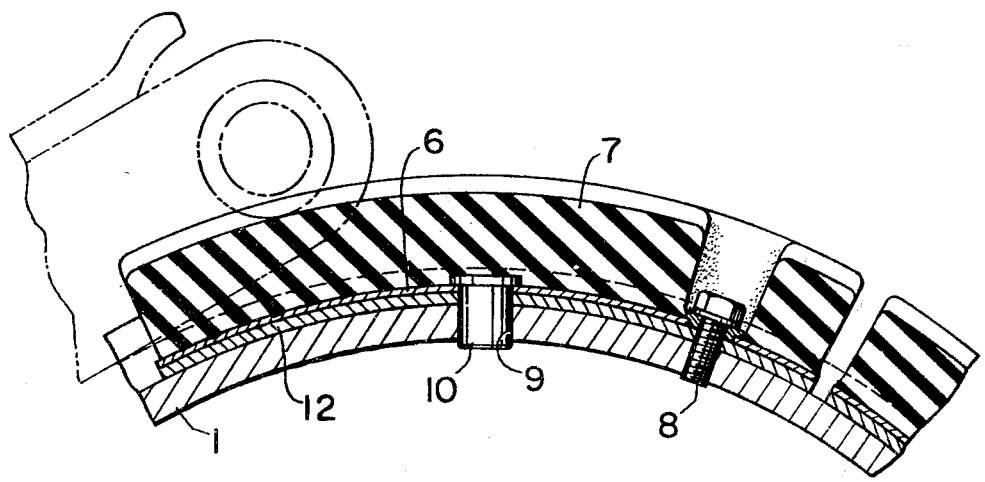
FIG. 7 is a longitudinal sectional view of a fourth embodiment of an idler according to the present invention.

Additionally, when the uppermost surface 5a of the shock-absorbing member 7 wears out, the shock-absorbing effect is reduced. In this case, a spacer 12 is inserted between the idler proper 1 and each mount-plate 6 as shown in FIG. 7.

It will be understood from the foregoing description that the idler according to the present invention can sufficiently reduct spontaneous noises generated by the impulsive contact between the track and the idler, since the height H of the shock-absorbing member 7 can be increased by the depth l of the annular groove 2, and that it can improve its endurance since the side walls 3 of the annular groove 2 can prevent the shock-absorbing member 7 from tumbling.

What is claimed is:

1. An idler for use in an endless track unit, comprising the combination of:
   a. an idler proper having an annular groove formed at an intermediate portion of the outer peripheral surface thereof, and
   b. a plurality of shock-absorbing member units, each being interchangeably secured into said annular groove by a bolt which is inserted thereinto and threadingly engaged with said idler proper, and each having a shock-absorbing member, a mounting plate fixedly secured to the inner peripheral surface of said shock-absorbing member and a positioning pin fitted into a positioning hole formed in said annular groove, wherein said annular groove is projected vertically beyond the outer peripheral surface of the idler proper and is bounded by side walls thereat to form step portions.

2. An idler as set forth in claim 1, further comprising another shock-absorbing member interchangeably inserted into the shock-absorbing member of each of said shock-absorbing member units at the upper side of said bolt so as to protect against the entrance of soil or sand.

3. An idler as set forth in claim 1, wherein said shock-absorbing member has at least one longitudinal groove formed at an intermediate portion of the outer peripheral surface thereof.

4. An idler as set forth in claim 1, further comprising a spacer inserted between said idler proper and said mounting plate.

* * * * *